(12) United States Patent
Rao et al.

(10) Patent No.: US 10,834,190 B2
(45) Date of Patent: Nov. 10, 2020

(54) PROVISIONING OF CLUSTERED CONTAINERIZED APPLICATIONS

(71) Applicant: Portworx, Inc., Santa Clara, CA (US)

(72) Inventors: Goutham Rao, Los Altos, CA (US); Vinod Jayaraman, San Francisco, CA (US); Ganesh Sangle, Sunnyvale, CA (US)

(73) Assignee: Portworx, Inc., Los Altos, CA (US)

( * ) Notice: Subject to any disclaimer, the term of this patent is extended or adjusted under 35 U.S.C. 154(b) by 0 days.

(21) Appl. No.: 15/874,115

(22) Filed: Jan. 18, 2018

(65) Prior Publication Data

US 2019/0222646 A1 Jul. 18, 2019

(51) Int. Cl.
*H04L 29/08* (2006.01)
*G06F 3/06* (2006.01)

(52) U.S. Cl.
CPC .......... *H04L 67/1097* (2013.01); *G06F 3/065* (2013.01); *G06F 3/067* (2013.01)

(58) Field of Classification Search
CPC ....... H04L 67/1097; G06F 3/065; G06F 3/067
USPC .......................................................... 709/217
See application file for complete search history.

(56) References Cited

U.S. PATENT DOCUMENTS

| | | | | |
|---|---|---|---|---|
| 8,006,111 B1* | 8/2011 | Faibish | ................. | G06F 1/3221 713/324 |
| 2009/0080759 A1* | 3/2009 | Bhaskar | ................. | G06T 7/001 382/141 |
| 2011/0035409 A1* | 2/2011 | Shimada | ............... | G06F 16/185 707/783 |
| 2011/0072206 A1* | 3/2011 | Ross | .................. | H04L 67/1097 711/108 |
| 2013/0024640 A1* | 1/2013 | Reed | ..................... | G06F 12/023 711/170 |
| 2013/0198557 A1* | 8/2013 | Bensinger | ........... | G06F 11/1451 714/3 |
| 2015/0106420 A1* | 4/2015 | Warfield | ............. | H04L 41/5041 709/201 |
| 2015/0156204 A1* | 6/2015 | Resch | .................. | H04L 63/101 707/783 |
| 2017/0041394 A1* | 2/2017 | Mortazavi | ........... | H04L 67/1097 |
| 2017/0097851 A1* | 4/2017 | Chen | ..................... | G06F 9/5077 |

* cited by examiner

*Primary Examiner* — Meng Vang
(74) *Attorney, Agent, or Firm* — Kwan & Olynick LLP (57) ABSTRACT

Clustered containerized applications are implemented with scalable provisioning. Methods include receiving a data storage request to store one or more data values in a storage volume implemented across a storage node cluster, the storage node cluster including a plurality of storage nodes including one or more storage devices having storage space allocated for storing data associated with the storage volume. Methods may further include identifying a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph. Methods may also include selecting a storage node on which to store the data, the selecting being based, at least in part, on the identified storage characteristics and one or more data distribution parameters associated with the storage volume.

20 Claims, 7 Drawing Sheets

PROVISIONING OF CLUSTERED CONTAINERIZED APPLICATIONS

TECHNICAL FIELD

The present disclosure relates generally to containerized applications and more specifically to containerized scalable storage applications.

DESCRIPTION OF RELATED ART

One of the most difficult challenges facing software developers is interoperability of software between different computing environments. Software written to run in one operating system typically will not run without modification in a different operating system. Even within the same operating system, a program may rely on other programs in order to function. Each of these dependencies may or may not be available on any given system, or may be available but in a version different from the version originally relied upon. Thus, dependency relationships further complicate efforts to create software capable of running in different environments.

In recent years, the introduction of operating-system-level virtualization has facilitated the development of containerized software applications. A system configured with operating-system-level virtualization includes a container engine that operates on top of the operating system. Importantly, the container engine is configured to operate interchangeably in different environments (e.g., with different operating systems). At the same time, the container engine is configured to present a standardized interface to one or more software containers.

Each software container may include computer programming code for performing one or more tasks. Examples of software containers include web servers, email servers, web applications, and other such programs. Each software container may include some or all of the software resources that the software in the container needs in order to function. For example, if a software container includes a web application written in the Python programming language, the software container may also include the Python programming language modules that the web application relies upon. In this way, the software container may be installed and may execute successfully in different computing environments as long as the environment includes a container engine. However, the implementation of such software containers in distributed contexts remains limited.

SUMMARY

Disclosed herein are systems, devices, and methods for provisioning of clustered containerized applications. Methods may include receiving, at a processor of a server, a data storage request to store one or more data values in a storage volume implemented across a storage node cluster, the storage node cluster including a plurality of storage nodes, each storage node including one or more storage devices having storage space allocated for storing data associated with the storage volume. Methods may further include identifying a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph. Methods may also include selecting a storage node on which to store the data, the selecting being based, at least in part, on the identified storage characteristics and one or more data distribution parameters associated with the storage volume. Methods may further include transmitting the one or more data values to the selected storage node.

In some embodiments, the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes. According to some embodiments, the storage characteristics are specific to replication characteristics of the storage volume. In various embodiments, the selecting of the node further includes identifying a plurality of candidate storage nodes based on a comparison of the identified storage characteristics and at least one of the storage characteristics of the storage nodes identified by the cluster hierarchy. In some embodiments, a plurality of candidate storage nodes is identified for each of a plurality of geographical regions. According to some embodiments, the selecting of the node further includes excluding at least one of the plurality of candidate storage nodes based on a comparison of the storage characteristics of the candidate storage nodes with the data distribution parameters. In various embodiments, the methods further include determining an order of the plurality of candidate storage nodes based, at least in part, on one or more storage characteristics of the plurality of candidate storage nodes. In some embodiments, methods also include executing the data storage request at the selected storage node. According to some embodiments, methods further include transmitting a storage node information update message to each of the other nodes in the cluster.

Further disclosed herein are systems that may include a network interface configured to receive a data storage request to store one or more data values in a storage volume implemented across a storage node cluster, the storage node cluster including a plurality of storage nodes, each storage node including one or more storage devices having storage space allocated for storing data associated with the storage volume. The systems may further include a processor configured to identify a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph. The processor may be further configured to select a storage node on which to store the data, the selecting being based, at least in part, on the identified storage characteristics and one or more data distribution parameters associated with the storage volume. The processor may be further configured to transmit the one or more data values to the selected storage node. The systems may also include a designated storage device configured to store data included in the data storage request.

In some embodiments, the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes. According to some embodiments, the processor is further configured to identify a plurality of candidate storage nodes based on a comparison of the identified storage characteristics and at least one of the storage characteristics of the storage nodes identified by the cluster hierarchy. In various embodiments, a plurality of candidate storage nodes is identified for each of a plurality of geographical regions. In some embodiments, the processor is further configured to exclude at least one of the plurality of candidate storage nodes based on a comparison of the storage characteristics of the candidate storage nodes with the data distribution parameters. According to some embodiments, the processor is further configured to determine an order of the plurality of candidate storage nodes based, at least in part, on one or more storage characteristics of the plurality of candidate storage nodes. In various embodiments, the network interface is further configured to transmit a storage node information update message to each of the other nodes in the cluster.

Further disclosed herein are one or more non-transitory computer readable media having instructions stored thereon for performing a method, the method including receiving, at a processor of a server, a data storage request to store one or more data values in a storage volume implemented across a storage node cluster, the storage node cluster including a plurality of storage nodes, each storage node including one or more storage devices having storage space allocated for storing data associated with the storage volume. The method may further include identifying a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph. The method may also include selecting a storage node on which to store the data, the selecting being based, at least in part, on the identified storage characteristics and one or more data distribution parameters associated with the storage volume. The method may further include transmitting the one or more data values to the selected storage node.

In some embodiments, the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes. According to some embodiments, the selecting of the node further includes identifying a plurality of candidate storage nodes based on a comparison of the identified storage characteristics and at least one of the storage characteristics of the storage nodes identified by the cluster hierarchy. In various embodiments, the selecting of the node further includes excluding at least one of the plurality of candidate storage nodes based on a comparison of the storage characteristics of the candidate storage nodes with the data distribution parameters, and determining an order of the plurality of candidate storage nodes based, at least in part, on one or more storage characteristics of the plurality of candidate storage nodes.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of fragments, particular servers and encoding mechanisms. However, it should be noted that the techniques of the present invention apply to a wide variety of different fragments, segments, servers and encoding mechanisms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein provide for the implementation of clustered containerized software applications as well as data storage requests associated with such clustered containerized software applications. In various embodiments, data may be stored in storage volumes implemented on storage nodes within a cluster based on, among other things, a determined cluster hierarchy, features of a storage volume, features of an application associated with the storage volume, and/or various other storage node characteristics. Accordingly, the distribution of data within a particular cluster may be configured in accordance with various parameters to improve data durability and availability, while reducing processing overhead of some storage nodes.

In this way, methods disclosed herein may implement data storage within one or more clusters of storage nodes while maintaining high availability of the data, fast potential recovery of the data, and balanced I/O burden across the storage nodes of the clusters. Moreover, embodiments disclosed herein may also facilitate the possible implementations of aggregations of storage volumes, as well as various storage volume constraints. In this way, the identification of candidate storage nodes and execution of data storage requests described herein provide improvements in failover tolerance of data, availability of the data, as well as balance in the utilization of storage and network resources.

EXAMPLE EMBODIMENTS

Techniques and mechanisms described herein may facilitate the configuration of a scalable storage container node system. In some embodiments, a scalable storage container node system may allow application containers in a virtualized application system to quickly and directly provision and scale storage. Further, the system may be configured to provide one or more user experience guarantees across classes of applications.

According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments.

In some implementations, storage volumes created according to the techniques and mechanisms described herein may be highly failure-tolerant. For example, a virtual storage volume may include data stored on potentially many different storage nodes. A storage node may fail for any of various reasons, such as hardware failure, network failure, software failure, or server maintenance. Data integrity may be maintained even if one or more nodes that make up a storage volume fail during data storage operations.

Figure 1:
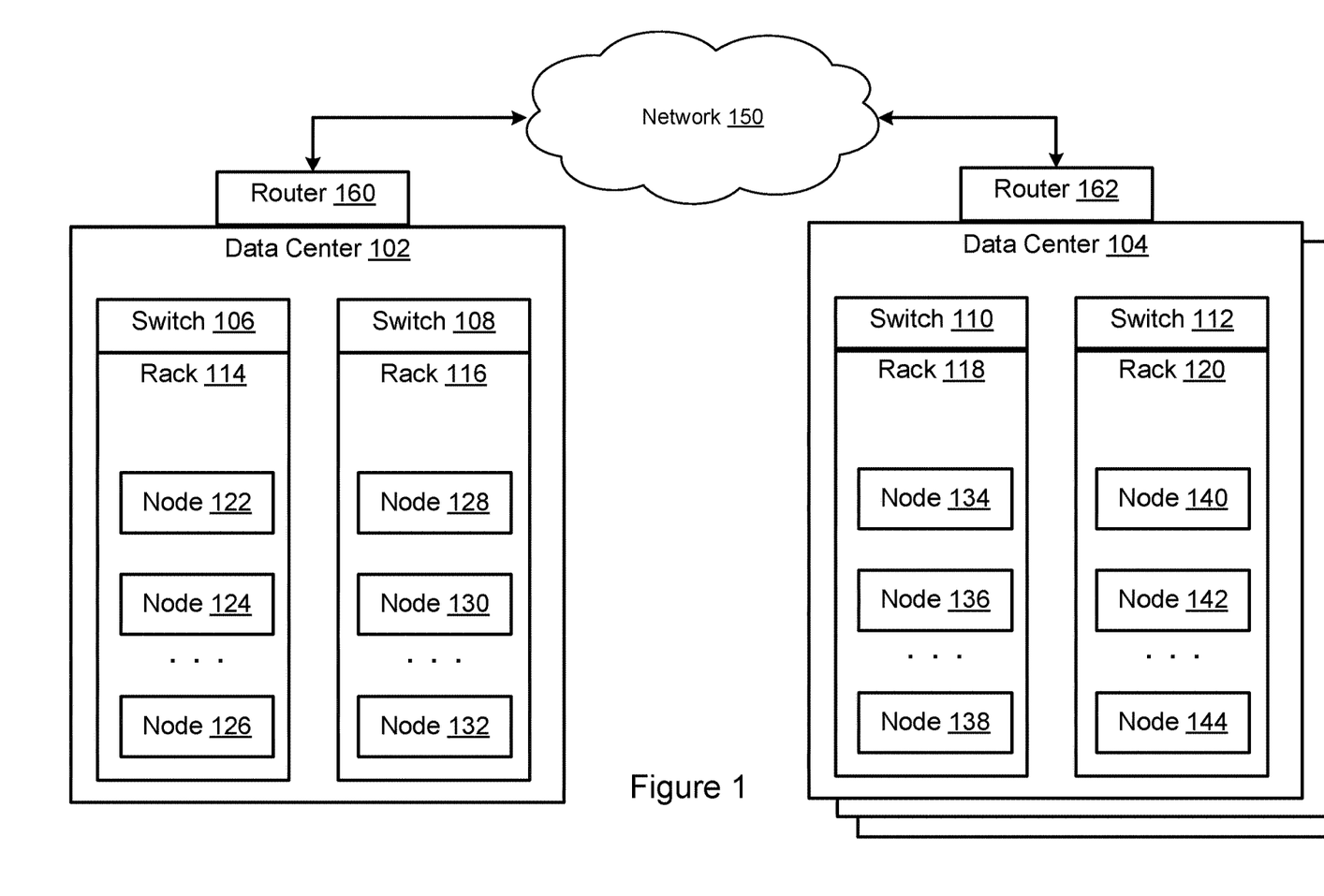
FIG. 1 illustrates an example of an arrangement of components in a containerized storage system.

FIG. 1 illustrates an arrangement of components in a containerized storage system. As will be discussed in greater detail below, such an arrangement of components may be configured such that clustered data storage is implemented, and copies of data stored at a particular storage container node within the cluster may be propagated amongst various other storage container nodes such that multiple copies of the data are available in case one of the storage container nodes fails. In various embodiments, and as will be discussed in greater detail below, one or more constraints may be implemented when determining which nodes to use during clustered data storage.

Accordingly, in various embodiments, nodes may be implemented in various data centers, such as data center 102 and data center 104. As similarly discussed above, a data center may include networked computing devices that may be configured to implement various containerized applications, such as storage nodes discussed in greater detail below. In various embodiments, such data centers and storage nodes may be configured to implement clustered storage of data. As discussed in greater detail below, the clustered storage of data may utilize one or more storage container nodes that are collectively configured to aggregate and abstract storage resources for the purpose of performing storage-related operations. Accordingly, data centers, such as data center 102 and data center 104 may each include various nodes underlying data clusters which may be implemented within a data center or across multiple data centers.

As discussed above, the data centers may include various nodes. For example, data center 102 may include node 122, node 124, node 126, node 128, node 130, and node 132. Moreover, data center may include additional nodes, such as node 134, node 136, node 138, node 140, node 142, and node 144. Such nodes may be physical nodes underlying storage nodes and storage volumes discussed in greater detail below. As shown in FIG. 1, nodes may be included in racks, such as rack 114, rack 116, rack 118, and rack 120. In various embodiments, each rack may be coupled with a switch, such as switch 106, switch 108, switch 110, and switch 112. Such switches may manage the flow of data amongst nodes within a particular rack.

Data centers and components within data centers, such as racks including nodes and their associated switches, may be coupled with routers, such as router 160 and router 162. In various embodiments, such routers may manage the flow of data between data centers and other components that may be coupled with a network, such as network 150. In some embodiments, network 150 may be, at least in part, a local network, or may be a global network such as the internet. Accordingly, network 150 may include numerous components and communications pathways that couple data centers with each other.

Figure 2:
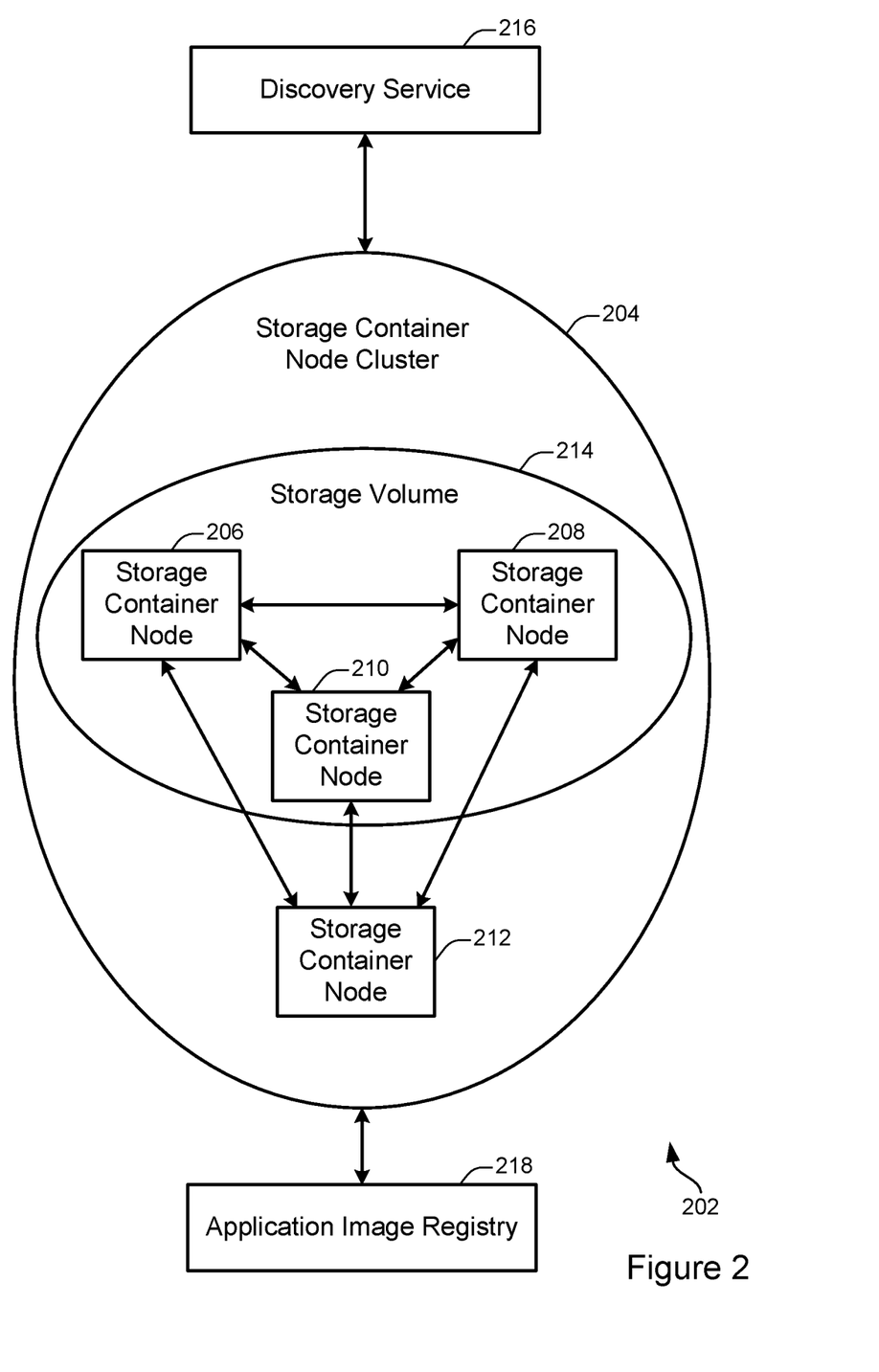
FIG. 2 illustrates an example of a scalable storage container node system, configured in accordance with one or more embodiments.

FIG. 2 illustrates an example of a scalable storage container node system 202. In some embodiments, the scalable storage container node system 202 may be capable of providing storage operations within the context of one or more servers configured to implement a container system. The scalable storage container node system 202 includes a storage container node cluster 204, which includes storage container nodes 206, 208, 210, and 212. The storage container nodes 206, 208, and 210 are combined to form a storage volume 214. The scalable storage container node system 202 also includes a discovery service 216 and an application image layer registry 218.

At 204, the storage container node cluster 204 is shown. According to various embodiments, a storage container node cluster may include one or more storage container nodes collectively configured to aggregate and abstract storage resources for the purpose of performing storage-related operations. Although the scalable storage container node system 202 shows only a single storage container node cluster, implementations of the techniques discussed herein may frequently include thousands or millions of storage container node clusters in a scalable storage container node system.

At 206, 208, 210, and 212, storage container nodes are shown. A storage container node may be configured as discussed with respect to the storage container node 202 shown in FIG. 202 or may be arranged in a different configuration. Each storage container node may include one or more privileged storage container such as the privileged storage container 216 shown in FIG. 2.

According to various embodiments, storage container nodes may be configured to aggregate storage resources to create a storage volume that spans more than one storage container node. By creating such a storage volume, storage resources such as physical disk drives that are located at different physical servers may be combined to create a virtual volume that spans more than one physical server.

The storage volume may be used for any suitable storage operations by other applications. For example, the containers 210, 212, and/or 214 shown in FIG. 2 may use the storage volume for storing or retrieving data. As another example, other applications that do not exist as containers may use the storage volume for storage operations.

In some implementations, the storage volume may be accessible to an application through a container engine, as discussed with respect to FIG. 2. For instance, a privileged storage container located at the storage container node 206 may receive a request to perform a storage operation on a storage volume that spans multiple storage nodes, such as the nodes 206, 208, 210, and 212 shown in FIG. 2. The privileged storage container may then coordinate communication as necessary among the other storage container nodes in the cluster and/or the discovery service 216 to execute the storage request.

At 214, a storage volume is shown. According to various embodiments, a storage volume may act as a logical storage device for storing and retrieving data. The storage volume 214 includes the storage container nodes 206, 208, and 210. However, storage volumes may be configured to include various numbers of storage container nodes. A storage volume may aggregate storage resources available on its constituent nodes. For example, if each of the storage container nodes 206, 208, and 210 include 2 terabytes of physical data storage, then the storage volume 214 may be configured to include 6 terabytes of physical data storage.

In some implementations, a storage volume may provide access to data storage for one or more applications. For example, a software application running on any of storage container nodes 206-212 may store data to and/or retrieve data from the storage volume 214. As another example, the storage volume 214 may be used to store data for an application running on a server not shown in FIG. 2.

At 216, a discovery service is shown. According to various embodiments, the discovery service may be configured to coordinate one or more activities involving storage container node clusters and/or storage container nodes. For example, the discovery service may be configured to initialize a new storage container node cluster, destroy an existing storage container node cluster, add or remove a storage container node from a storage container node cluster, identify which node or nodes in a storage container node cluster are associated with a designated storage volume, and/or identify the capacity of a designated storage volume.

In some implementations, a discovery service may be configured to add a storage container node to a storage container node cluster. An example of such a method is described in additional detail with respect to FIG. 4. In some implementations, a discovery service may be configured to facilitate the execution of a storage request.

According to various embodiments, the discovery service may be configured in any way suitable for performing coordination activities. For instance, the discovery service may be implemented as a distributed database divided among a number of different discovery service node. The discovery service may include a metadata server that store information such as which storage container nodes correspond to which storage container node clusters and/or which data is stored on which storage container node. Alternately, or additionally, the metadata server may store information such as which storage container nodes are included in a storage volume.

Figure 3:
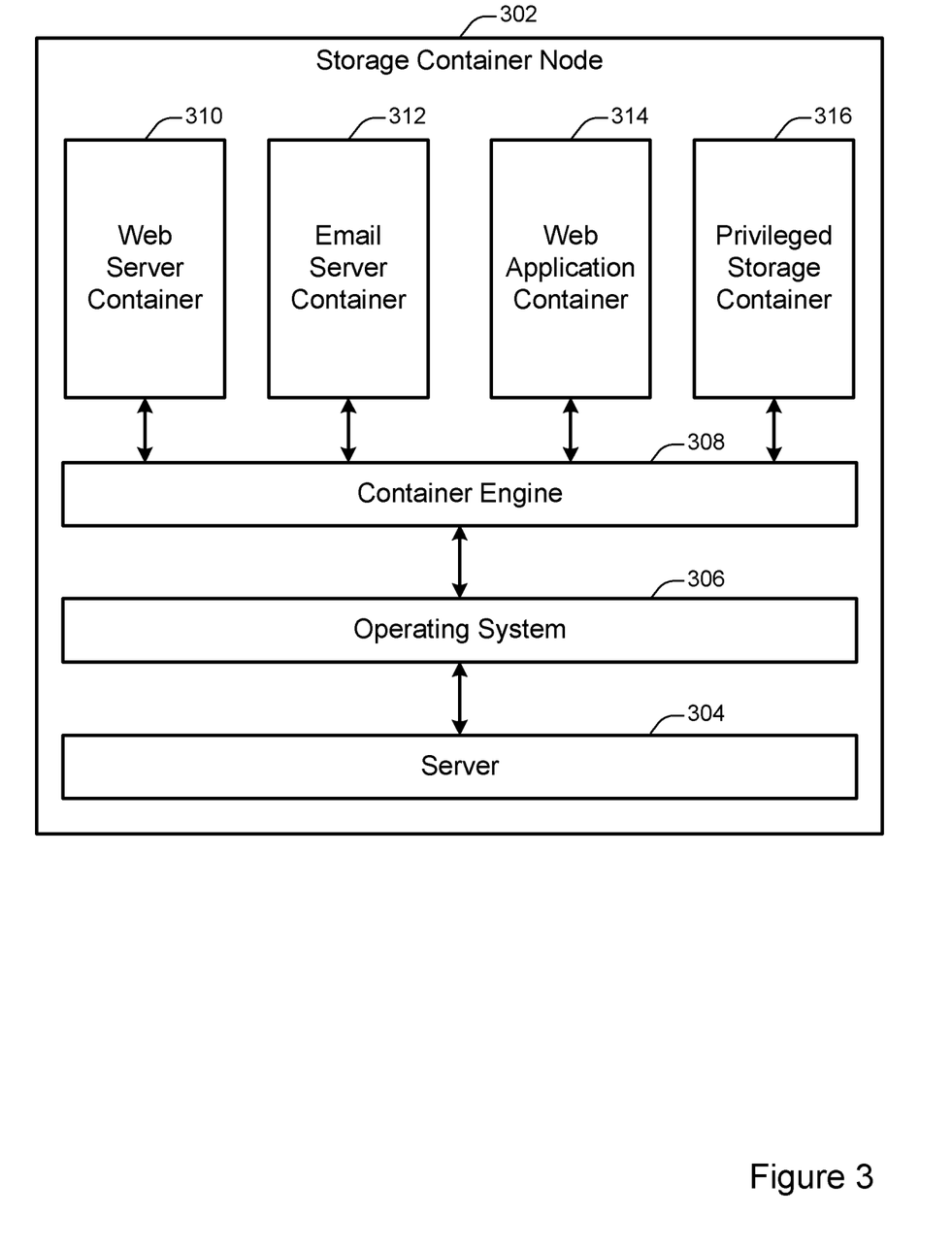
FIG. 3 illustrates an example of a storage container node, configured in accordance with one or more embodiments.

FIG. 3 illustrates an example of a storage container node 302. According to various embodiments, a storage container node may be a server configured to include a container engine and a privileged storage container. The storage container node 302 shown in FIG. 3 includes a server layer 304, an operating system layer 306, a container engine 308, a web server container 310, an email server container 312, a web application container 314, and a privileged storage container 316.

In some embodiments, the storage container node 302 may serve as an interface between storage resources available at a server instance and one or more virtual storage volumes that span more than one physical and/or virtual server. For example, the storage container node 302 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

At 304, the server layer is shown. According to various embodiments, the server layer may function as an interface by which the operating system 306 interacts with the server on which the storage container node 302 is implemented. A storage container node may be implemented on a virtual or physical server. For example, the storage container node 302 may be implemented at least in part on the server shown in FIG. 5. The server may include hardware such as networking components, memory, physical storage devices, and other such infrastructure. The operating system layer 306 may communicate with these devices through a standardized interface provided by the server layer 304.

At 306, the operating system layer is shown. According to various embodiments, different computing environments may employ different operating system layers. For instance, a physical or virtual server environment may include an operating system based on Microsoft Windows, Linux, or Apple's OS X. The operating system layer 306 may provide, among other functionality, a standardized interface for communicating with the server layer 304.

At 308, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 304, an operating system layer 306, and a container engine layer 308 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 302 includes the web server container 220, the email server container 312, and the web application container 314. A software container may include customized computer code configured to perform any of various tasks. For instance, the web server container 220 may provide files such as webpages to client machines upon request. The email server 312 may handle the receipt and transmission of emails as well as requests by client devices to access those emails. The web application container 314 may be configured to execute any type of web application, such as an instant messaging service, an online auction, a wiki, or a webmail service. Although that storage container node 302 shown in FIG. 3 includes three software containers, other storage container nodes may include various numbers and types of software containers.

At 316, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 220, 312, and 314 or other software containers located in different computing environments. For example, a software container may transmit a storage request to the container engine 308 via a standardized interface. The container engine 308 may transmit the storage request to the privileged storage container 316. The privileged storage container 316 may then communicate with privileged storage containers located on other storage container nodes and/or may communicate with hardware resources located at the storage container node 302 to execute the request.

In some implementations, one or more software containers may be afforded limited permissions in the computing environment in which they are located. For example, in order to facilitate a containerized software environment, the software containers 310, 312, and 314 may be restricted to communicating directly only with the container engine 308 via a standardized interface. The container engine 308 may then be responsible for relaying communications as necessary to other software containers and/or the operating system layer 306.

In some implementations, the privileged storage container 316 may be afforded additional privileges beyond those afforded to ordinary software containers. For example, the privileged storage container 316 may be allowed to communicate directly with the operating system layer 306, the server layer 304, and/or one or more physical hardware components such as physical storage devices. Providing the storage container 316 with expanded privileges may facilitate efficient storage operations such as storing, retrieving, and indexing data.

Figure 4:
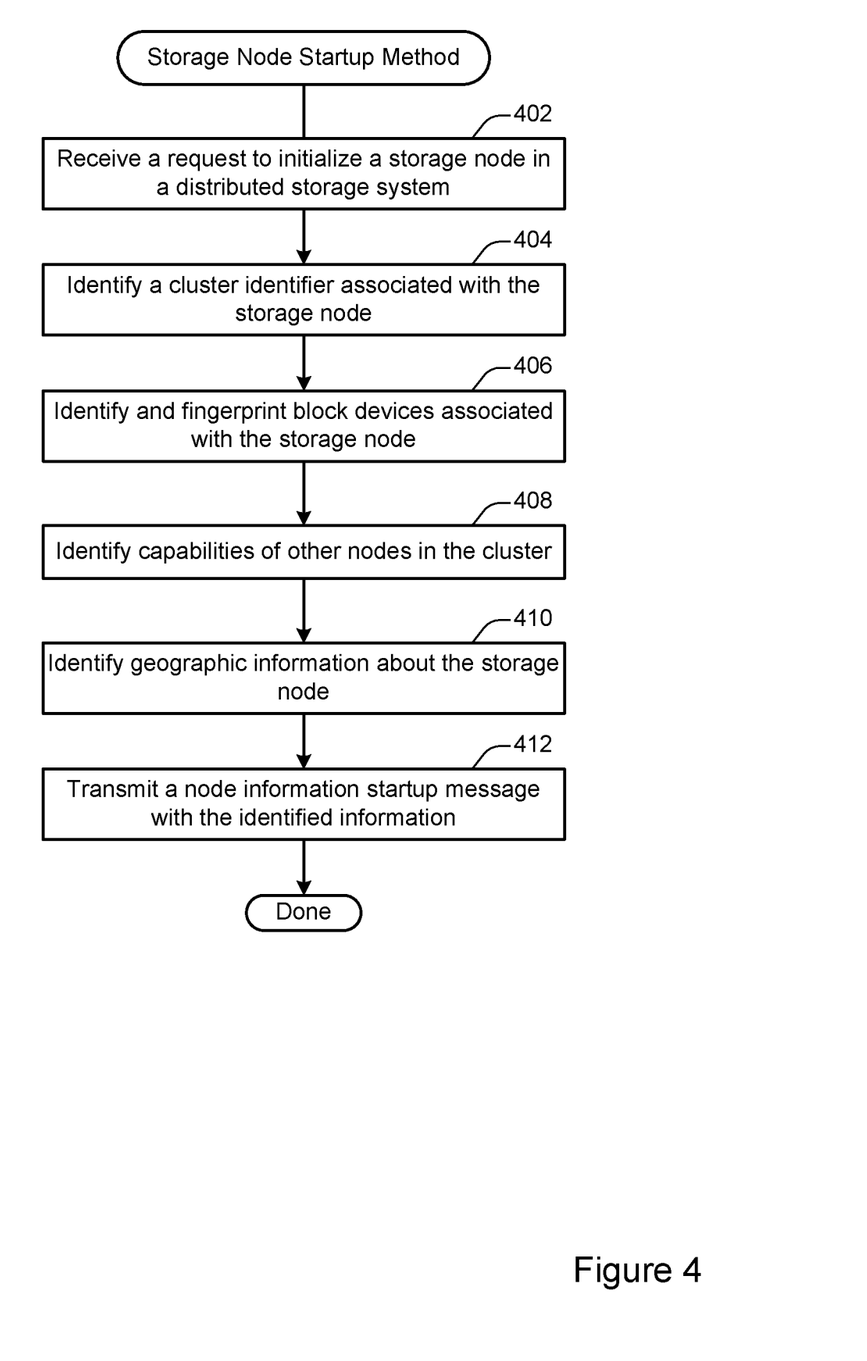
FIG. 4 illustrates a flow chart of an example of a method for starting up a storage node.

FIG. 4 illustrates a flow chart of an example of a method for starting up a storage node. Accordingly, a method, such as method 400, may be implemented to initialize a storage node when that node joins a cluster and becomes available to implement data storage operations. As will be discussed in greater detail below, such an initialization process may include the identification of data associated with various other nodes in the cluster, and such data may be used to generate a cluster hierarchy.

At 402, a request to initialize a storage node in a distributed storage system may be received. According to various embodiments, the request to initialize a new storage container node may be generated when a storage container node is activated. For instance, an administrator or configuration program may install a storage container on a server instance that includes a container engine to create a new storage container node. In various embodiments, the storage node may be included in a distributed storage system. In one example, the distributed storage system may implement storage nodes in clusters. Accordingly, the administrator or configuration program may provide a cluster identifier indicating a cluster to which the storage container node should be added. The storage container node may then communicate with the discovery service to complete the initialization.

At 404, a cluster identifier associated with the storage node may be identified. According to various embodiments, as similarly discussed above, the cluster identifier may be included with the received request. Alternately, or additionally, a cluster identifier may be identified in another way, such as by consulting a configuration file. Accordingly, the cluster identifier may be identified and retrieved based on the request, a configuration file, or from any other suitable source.

At 406, block devices associated with the storage node may be identified. In various embodiments, the block devices may be devices used to store storage volumes in a storage node. Accordingly, a particular storage node may be associated with several block devices. In various embodiments, the block devices associated with the storage node being initialized may be identified based on an input provided by the administrator, or based on a configuration file. In one example, such a configuration file may be retrieved from another node in the identified cluster.

Moreover, the identified block devices may be fingerprinted. In various embodiments, the fingerprinting may identify capabilities of various storage devices, such as drives, that may be utilized by the block devices and/or accessible to the storage node. Such storage devices may be solid state drives (SSDs), solid state hybrid drives (SSHDs), or hard disk drives (HDDs). Types of connections with such storage devices may also be identified. Examples of such connections may be any suitable version of SATA, PATA, USB, PCI, or PCIe. In some embodiments, an input/output (I/O) speed may be inferred based on the device type and connection type. In this way, it may be determined how many storage devices are available to the storage node, how much available space they have, and what type of storage devices they are, as well as how they are connected.

As discussed above, fingerprinting data may include information about underlying physical devices, such as device capacity, I/O speeds and characteristics, as well as throughput and latency characteristics. In various embodiments, such fingerprinting data may be generated based on benchmarking tools that may be implemented and run dynamically, or may have been run previously, and had results stored in a metadata server. In some embodiments, such fingerprinting data may be retrieved from a location in the cloud environment, such as the metadata server or an API server, and such data may be retrieved during the startup process. In various embodiments, such data may be retrieved from a remote location that may include technical specifications or characteristics of the underlying physical devices which may have been determined by a component manufacturer.

At 408, capabilities of other nodes in the cluster may be identified. As discussed above, such capabilities of the other nodes may identify how many storage devices are available to those storage nodes, how much available space they have, and what type of storage devices they are, as well as how they are connected. In various embodiments, capabilities of the other nodes may be one or more performance characteristics, such as I/O capabilities and speeds. Such capabilities may be determined based on devices types of underlying physical devices. For example, a particular type of device may be identified, such as a SSDs, and a particular I/O speed may be identified based on the identified device type. As discussed above, capabilities may also be other characteristics of the nodes, such as a storage capacity of the node, which may be determined based on available storage in one or more underlying physical devices. It will be appreciated that storage capacity may refer to total and/or free capacity of a particular storage node, a particular storage device, and/or a particular storage volume. In various embodiments, such capabilities may be determined based on data included in a configuration file which may be propagated among nodes in the cluster.

At 410, geographic information about the storage node may be identified. In various embodiments, the geographic information may be particular geographical characteristics of a physical location of the storage node. For example, such geographic information may include a first identifier that identifies a rack, or other physical device unit, in which the storage node is located. The geographic information may also include a second identifier that identifies a zone, which may be a particular data center. The geographic information may further include a third identifier that identifies a region or geographical area in which the storage node is located. In various embodiments, such geographic information may be stored at each node, and may be determined based on a query issued to a metadata server. Accordingly, the query to the metadata server may be used by the metadata server to determine geographic information, and such geographic information may be provided to the storage node where it is maintained. In some embodiments, a scheduler may be implemented to maintain such geographic information. In various embodiments, geographic regions may be defined by an entity, such as an administrator, or based upon one or more designated regions, such as a time zone or other designated region such as "Eastern U.S.". While examples of a first, second, and third identifier have been described, any suitable number of identifiers may be used.

At 412, a node information startup message may be transmitted. In various embodiments, the node information startup message may include the identified information. Accordingly, the previously described information may be included in a message and may be transmitted to one or more other nodes in the cluster. In this way, the information associated with the storage node that has been initialized may be propagated to other nodes within the cluster.

Figure 5:
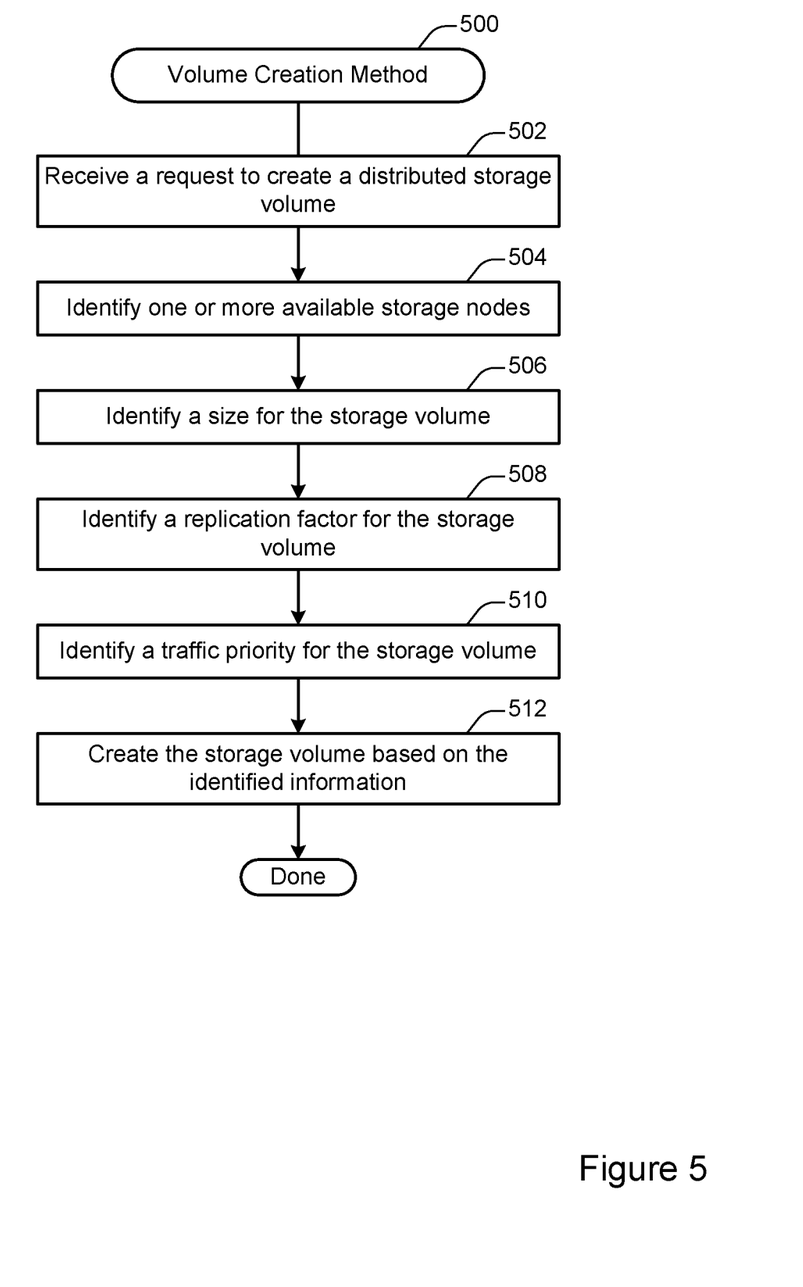
FIG. 5 illustrates a flow chart of an example of a method for creating a storage volume.

FIG. 5 illustrates a flow chart of an example of a method for creating a storage volume. Accordingly, a method, such as method 500, may be implemented to create a storage volume that may be implemented on a storage node. As will be discussed in greater detail below, the creation of the storage volume may include the identification of various features of the storage volume, and such features may be related to or dependent on a particular type of application that is utilizing the storage volume.

At 502, a request to create a distributed storage volume may be received. In various embodiments, the request may be received from an entity or application. For example, the request may be received from an application that is implemented on a particular node. Such a request may be received responsive to the application indicating a storage volume should be created to facilitate execution and implementation of the application or one of its features. In a specific example, the application may be a database or distributed storage application that is configured to implement multiple storage volumes. Accordingly, such an application may issue a request to implement a storage volume to support database functionalities.

At 504, one or more available storage nodes may be identified. In various embodiments, such available storage nodes may be identified based on one or more characteristics of the storage nodes. For example, the storage nodes may have status identifiers which may indicate whether or not a particular storage node is available to implement additional storage volumes, or unavailable and not able to implement additional storage volumes. Such status identifiers may be stored and maintained in a configuration file, and may be propagated among nodes in the cluster. Accordingly, at 504, available storage nodes may be identified based on status identifiers.

At 506, a size for the storage volume may be identified. In various embodiments, the size of the storage volume may be identified based on the request received at 502. For example, the request may include various characteristics of the storage volume to be implemented, such as its size, and such characteristics may have been determined by the application that issued the request. Accordingly, at 506, a size of the storage volume may be identified based on information that was included in the request.

At 508, a replication factor for the storage volume may be identified. In some embodiments, a replication factor may identify a number of storage nodes and/or storage volumes data is to be replicated to within a particular cluster. According to various embodiments, the replication factor may be identified based on the request received at 502. For example, the request may include an indication of a replication factor to be implemented. In another example, the replication factor may be assigned based on a designated value that may be have been determined by an entity, such as an administrator.

At 510, a traffic priority for the storage volume may be identified. In various embodiments, a traffic priority may be a priority or hierarchy that determines and prioritizes which traffic is allocated to available hardware and network resources in which order. Accordingly, a traffic priority may be determined for the storage volume based on one or more characteristics of the storage volume, an application that may be associated with the storage volume, and data that may be associated with the storage volume. For example, a storage volume may be assigned a higher traffic priority if the data being stored in the storage volume is considered to be "dynamic" data that is expected to be read and written frequently, as may be determined based on information included in the request received at 502.

In one specific example, the storage volume may be associated with MySQL data that will be frequently read and re-written to accommodate database operations. In this example, such a storage volume should have low latency I/O characteristics of underlying devices, and would be assigned a high traffic priority. In another example, volumes implemented for streaming purposes also should have low latencies, and may also be assigned high traffic priorities. Additional examples may include volumes implemented using Apache Cassandra or Hadoop, which should have high throughput characteristics of underlying devices, and would also be assigned a high traffic priority. In another example, a storage volume may store backup data that is written once and rarely retrieved. Such a storage volume may be assigned a low traffic priority. In yet another example, a storage volume may be used to implement a file server, where there may be frequent data accesses, but some additional latency may be tolerable. Such a storage volume may be assigned a medium traffic priority. In various embodiments, traffic priorities may be associated with categories that are determined based on an impact to an end user.

At 512, the storage volume may be created based on the identified information. Therefore, based on the identified information one or more storage volumes may be created. In this way, a storage volume may be created that is implemented on an available node, is consistent with a specified size, has been implemented in accordance with a particular replication factor with other identified available storage nodes, and has been assigned a particular traffic priority. As will be discussed in greater detail below, the utilization and implementation of such storage volumes may be further configured to provide high availability, fast data recovery, balanced I/O burden as well as various other features among storage volumes and their underlying storage nodes.

Figure 6:
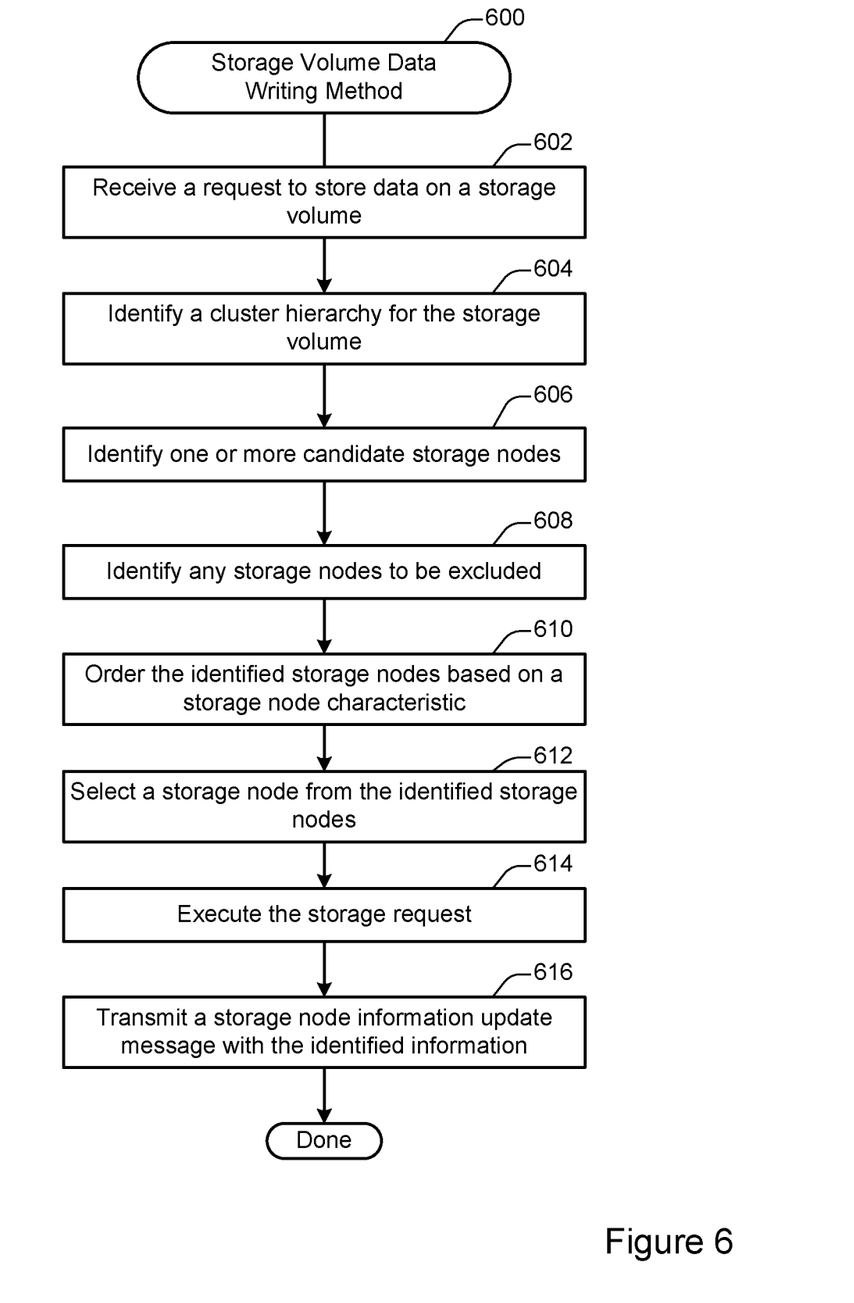
FIG. 6 illustrates a flow chart of an example of a method for writing storage volume data.

FIG. 6 illustrates a flow chart of an example of a method for writing storage volume data. As will be discussed in greater detail below, a method, such as method 600, may implement data storage within one or more clusters of storage nodes while maintaining high availability of the data, fast potential recovery of the data, and balanced I/O burden across the storage nodes of the clusters. Moreover, embodiments disclosed herein may also facilitate the possible implementations of aggregations of storage volumes, as well as various storage volume constraints. In this way, the identification of candidate storage nodes and execution of data storage requests described herein provide improvements in failover tolerance of data, availability of the data, as well as balance in the utilization of storage and network resources.

At 602, a request to store data on a storage volume may be received. In various embodiments, the request may have been generated by an application that has requested to write data to a storage volume that may be implemented on one or more storage nodes, as similarly discussed above with at least respect to FIG. 2. As also discussed above, the storage volume may be implemented as a block device and may be utilized as a storage device for the requesting application. In a specific example, the application may be a database application, and the storage volume may be one of many storage volumes managed by the database application.

At 604, a cluster hierarchy for the storage volume may be identified. In various embodiments, a cluster hierarchy may identify or characterize various features or storage characteristics of the storage nodes within the cluster that is associated with the requesting application. For example, such storage characteristics identified by the cluster hierarchy may be identifiers of storage nodes in the cluster, their current status, their storage capacities, their capabilities, and their geographical features. In various embodiments, such a cluster hierarchy may be retrieved from a particular storage node, as such information may be propagated throughout the cluster. In various embodiments, the cluster hierarchy may characterize or represent the storage nodes based on geographical information, such as region, zone, and rack, and may also include data characterizing capabilities of the nodes, such as total capacity, free capacity, drive type(s), drive speed(s), and types of drive connection(s). In one example, the cluster hierarchy may represent such nodes and geographical information as having a particular structure, such as a "tree". Accordingly, the cluster hierarchy may be stored as a matrix or a network graph that characterizes or represents node-to-node proximity, and is distributed amongst the cluster and globally accessible.

In various embodiments, the cluster hierarchy may further identify physical location information of the storage nodes. For example, the cluster hierarchy may include information that indicates node-to-node proximity on a network graph. In various embodiments, node-to-node proximity may identify whether or not nodes are implemented within the same rack, zone, and/or region. Accordingly, such a network graph may be generated from the perspective of the storage node that initially receives the data storage request, and may identify a node-to-node proximity for all other nodes in the cluster. In various embodiments, such node-to-node proximities may be inferred based on latency information resulting from pings sent to those other nodes. For example, very low latencies may be used to infer that nodes are included in the same rack. Furthermore, existing cluster hierarchies generated by other nodes during their initialization, which may have occurred previously, may be retrieved and used to augment the currently generated cluster hierarchy and/or verify node-to-node proximities of the currently generated cluster hierarchy.

At 606, one or more candidate nodes may be identified. In various embodiments, the candidate nodes may be nodes that may be capable of implementing the storage request consistent with one or more storage parameters. Accordingly, storage parameters may be a set of specified storage characteristics that are features of candidate storage nodes that indicate that they are able to satisfactorily support implementation of the data storage request. More specifically, such candidate storage nodes may be any nodes within a cluster hierarchy that have enough available storage space to execute the storage request, and can also support various other specified characteristics, examples of which may be a desired replicability and latency. As will be discussed in greater detail below, the implementation of such parameters along with additional constraints may be configured to ensure that the execution of the storage request on such candidate nodes is consistent with maintaining high availability of the data, fast potential recovery of the data, balanced I/O burden across the storage nodes of the cluster, possible implementations of aggregations of storage volumes, and one or more storage volume constraints discussed in greater detail below.

As similarly discussed above, the storage parameters, may include specified characteristics. For example, the specified characteristics may identify a specified I/O capability which may have been specified by the requesting application, or may have been determined based on one or more features of the storage volume in which the data is to be stored. In various embodiments, the storage parameters may be compared with the features and characteristics of storage nodes to determine which storage nodes meet the criteria or constraints set forth by the storage parameters. Additional examples of storage parameters may include a geographical location, such as region and rack, a status, and a storage capacity. In a specific example, different regions may be scanned, and candidate storage nodes may be identified for each particular region. Accordingly, different sets of candidate storage nodes may be identified for particular geographical regions.

At 608, one or more nodes may be excluded. In various embodiments, one or more candidate storage nodes may be excluded based on one or more constraints. Such constraints may be specific sets of features or characteristics of the storage nodes, features of the storage volume, or features of the application implemented on the storage node. In various embodiments, the constraints may be included in the data storage request, or may be inferred based on the contents of the request, the features of the storage volume and/or the application associated with the request. Accordingly, the constraints may be storage volume specific constraints, such as whether or not the data storage request is associated with a storage volume that is included in a group of storage volumes, as may be the case with a striped storage volume in which data is striped across a group of storage volumes.

For example, a 100 GB aggregated storage volume may be striped across 10 storage volumes such that each storage volume stores 10 GB of the aggregated storage volume. In this example, the storage volumes may be implemented in the same rack. Accordingly, the constraints may indicate that only storage nodes from that rack should be identified as candidates, and all others should be excluded. Accordingly, such constraints may be configured to implement storage volume specific rules. In various embodiments, the constraints may include various other characteristics, such as application specific replication requirements, and application specific I/O requirements.

Various other constraints may be implemented as well. For example, replication priority may be used to exclude candidate storage nodes. As discussed above, a particular storage node, rack, data center, or region could fail. To protect against such failure, the implementation of replication priority may be guaranteed for a storage volume. In some embodiments, the system may attempt to implement the maximum level of replication priority that a storage node supports. For example, if it is determined that all data needs to be stored on a single rack for fast I/O, then replication of data would not be implemented within the rack, but may be implemented at storage nodes of other racks which may be in other racks, zones, and/or regions. In another example, if it is determined that data needs to be protected against a data center failure, then the data may be split across different zones. In this example, storage nodes utilized for replication of data would exclude storage nodes in the same zone as the storage node that initially receives the data storage request. In this way, various constraints, also referred to herein as data distribution parameters, may be identified based on parameters received and determined during creation of a volume or node, and determined based on I/O patterns, and such constraints may be used to identify nodes that match or meet the constraints. Accordingly, storage nodes that don't meet particular criteria or constraints may be excluded, while storage nodes that do meet the criteria or constraints may be ordered to maximize I/O given those constraints, as will be discussed in greater detail below.

At 610, the identified storage nodes may be ordered based on one or more storage node characteristics. For example, the identified storage nodes may be ordered based on available size. As discussed above, the available size and storage capacity of the storage nodes may have been identified. In various embodiments, the identified candidate storage nodes may be sorted in descending order of available size. In this way, storage nodes with the greatest capacity may be prioritized first, and the storage of data may be balanced among the available storage nodes. In various embodiments, the identified storage nodes may be ordered based on other storage node characteristics as well, such as I/O capabilities. Moreover, the identified candidate storage nodes may be ordered based on combinations of the storage node characteristics.

At 612, one or more storage nodes may be selected from the identified storage nodes. Accordingly, a particular storage node, or several storage nodes, may be selected in accordance with the order set forth at 610. For example, the candidate storage nodes may be ordered at 610, and the first candidate storage node may be selected. In some embodiments, additional storage nodes may be identified to implement one or more other features, such as a replication factor. In another example, a best storage node may be selected from each of several different rack, zones, or regions, and such storage nodes may be used to implement the storage request, as discussed in greater detail below.

At 614, the storage request may be executed. Accordingly, the data included in the storage request may be stored in a storage volume implemented on the identified storage node. Moreover, the data may be replicated to one or more other identified storage nodes in a manner consistent with the previously described order of identified candidate storage nodes as well as a replication factor. For example, if a replication factor indicates that five copies of the data should be stored in other nodes, the data may be stored on an additional five identified candidate nodes as set forth at 610 and 612.

At 616, a storage node information update message may be transmitted. In various embodiments, the storage node information update message may include updated information that identifies the updated features of the storage node at which the storage request was executed. For example, the message may include an updated storage capacity. The message may be sent to the other storage nodes in the cluster thus propagating the information throughout the cluster.

Figure 7:
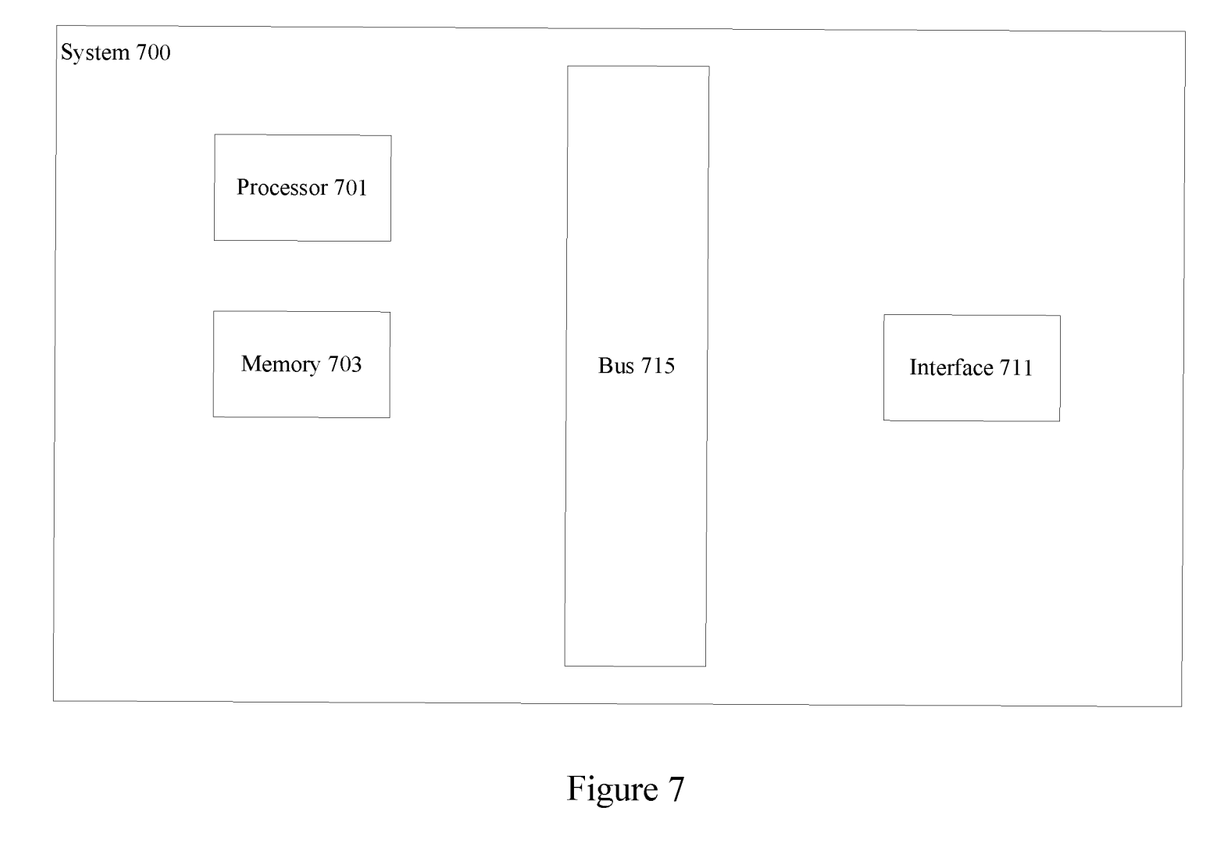
FIG. 7 illustrates an example of a server.

FIG. 7 illustrates one example of a server. According to particular embodiments, a system 700 suitable for implementing particular embodiments of the present invention includes a processor 701, a memory 703, an interface 711, and a bus 715 (e.g., a PCI bus or other interconnection fabric) and operates as a streaming server. When acting under the control of appropriate software or firmware, the processor 701 is responsible for modifying and transmitting live media data to a client. Various specially configured devices can also be used in place of a processor 701 or in addition to processor 701. The interface 711 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 700 is a server configured to run a container engine. For example, the system 700 may be configured as a storage container node as shown in FIG. 1. The server may include one or more hardware elements as shown in FIG. 7. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method comprising:
receiving, at a processor of a server, a data storage request associated with a containerized software application to store one or more data values in a storage volume implemented across a storage node cluster, the storage node cluster including a plurality of storage nodes, each storage node including one or more storage devices having storage space allocated for storing data associated with the storage volume;
identifying a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph, wherein the cluster hierarchy is based on data characterizing capabilities of the nodes, including total capacity, free capacity, drive type, and drive speed, wherein the data characterizing capabilities are determined based on data included in a configuration file which are propagated among nodes in the storage node cluster;
selecting a storage node on which to store the data, the selecting being based, at least in part, on the identified storage characteristics and one or more data distribution parameters associated with the storage volume; and
transmitting the one or more data values to the selected storage node.

2. The method of claim 1, wherein the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes.

3. The method of claim 1, wherein the storage characteristics are specific to replication characteristics of the storage volume.

4. The method of claim 1, wherein the selecting of the node further comprises:
identifying a plurality of candidate storage nodes based on a comparison of the identified storage characteristics and at least one of the storage characteristics of the storage nodes identified by the cluster hierarchy.

5. The method of claim 4, wherein a plurality of candidate storage nodes is identified for each of a plurality of geographical regions.

6. The method of claim 4, wherein the selecting of the node further comprises:
excluding at least one of the plurality of candidate storage nodes based on a comparison of the storage characteristics of the candidate storage nodes with the data distribution parameters.

7. The method of claim 4 further comprising:
determining an order of the plurality of candidate storage nodes based, at least in part, on one or more storage characteristics of the plurality of candidate storage nodes.

8. The method of claim 1 further comprising:
executing the data storage request at the selected storage node.

9. The method of claim 1 further comprising:
transmitting a storage node information update message to each of the other nodes in the cluster.

10. A system comprising:
a network interface configured to receive a data storage request associated with a containerized software application to store one or more data values in a storage volume implemented across a storage node cluster, the storage node cluster including a plurality of storage nodes, each storage node including one or more storage devices having storage space allocated for storing data associated with the storage volume;
a processor configured to:
identify a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph, wherein the cluster hierarchy is based on data characterizing capabilities of the nodes, including total capacity, free capacity, drive type, and drive speed, wherein the data characterizing capabilities are determined based on data included in a configuration file which are propagated among nodes in the storage node cluster;
select a storage node on which to store the data, the selecting being based, at least in part, on the identified storage characteristics and one or more data distribution parameters associated with the storage volume;
transmit the one or more data values to the selected storage node; and a designated storage device configured to store data included in the data storage request.

11. The system of claim 10, wherein the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes.

12. The system of claim 10, wherein the processor is further configured to:
identify a plurality of candidate storage nodes based on a comparison of the identified storage characteristics and at least one of the storage characteristics of the storage nodes identified by the cluster hierarchy.

13. The system of claim 12, wherein a plurality of candidate storage nodes is identified for each of a plurality of geographical regions.

14. The system of claim 12, wherein the processor is further configured to:
exclude at least one of the plurality of candidate storage nodes based on a comparison of the storage characteristics of the candidate storage nodes with the data distribution parameters.

15. The system of claim 12, wherein the processor is further configured to:
determine an order of the plurality of candidate storage nodes based, at least in part, on one or more storage characteristics of the plurality of candidate storage nodes.

16. The system of claim 10, wherein the network interface is further configured to:
   transmit a storage node information update message to each of the other nodes in the cluster.

17. One or more non-transitory computer readable media having instructions stored thereon that, when executed by a processor, performs a method, the method comprising:
   receiving a data storage request associated with a containerized software application to store one or more data values in a storage volume implemented across a storage node cluster, the storage node cluster including a plurality of storage nodes, each storage node including one or more storage devices having storage space allocated for storing data associated with the storage volume;
   identifying a cluster hierarchy associated with the storage node cluster, the cluster hierarchy identifying storage characteristics of the plurality of storage nodes, the cluster hierarchy also identifying physical location information for the plurality of storage nodes, the physical location information indicating node-to-node proximity on a network graph, wherein the cluster hierarchy is based on data characterizing capabilities of the nodes, including total capacity, free capacity, drive type, and drive speed, wherein the data characterizing capabilities are determined based on data included in a configuration file which are propagated among nodes in the storage node cluster;
   selecting a storage node on which to store the data, the selecting being based, at least in part, on the identified storage characteristics and one or more data distribution parameters associated with the storage volume; and
   transmitting the one or more data values to the selected storage node.

18. The one or more non-transitory computer readable media recited in claim 17, wherein the storage characteristics identified by the cluster hierarchy include identifiers of storage nodes included in the cluster, a current status of each of the storage nodes, a storage capacity of each of the storage nodes, an input/output (I/O) capability of each of the storage nodes, and geographical features of each of the storage nodes.

19. The one or more non-transitory computer readable media recited in claim 17, wherein the selecting of the node further comprises:
   identifying a plurality of candidate storage nodes based on a comparison of the identified storage characteristics and at least one of the storage characteristics of the storage nodes identified by the cluster hierarchy.

20. The one or more non-transitory computer readable media recited in claim 19, wherein the selecting of the node further comprises:
   excluding at least one of the plurality of candidate storage nodes based on a comparison of the storage characteristics of the candidate storage nodes with the data distribution parameters; and
   determining an order of the plurality of candidate storage nodes based, at least in part, on one or more storage characteristics of the plurality of candidate storage nodes.

* * * * *